Dec. 7, 1965  H. J. BALDWIN  3,221,606
MACHINE TOOL SPINDLE COOLING SYSTEM
Filed Feb. 10, 1964  3 Sheets-Sheet 1
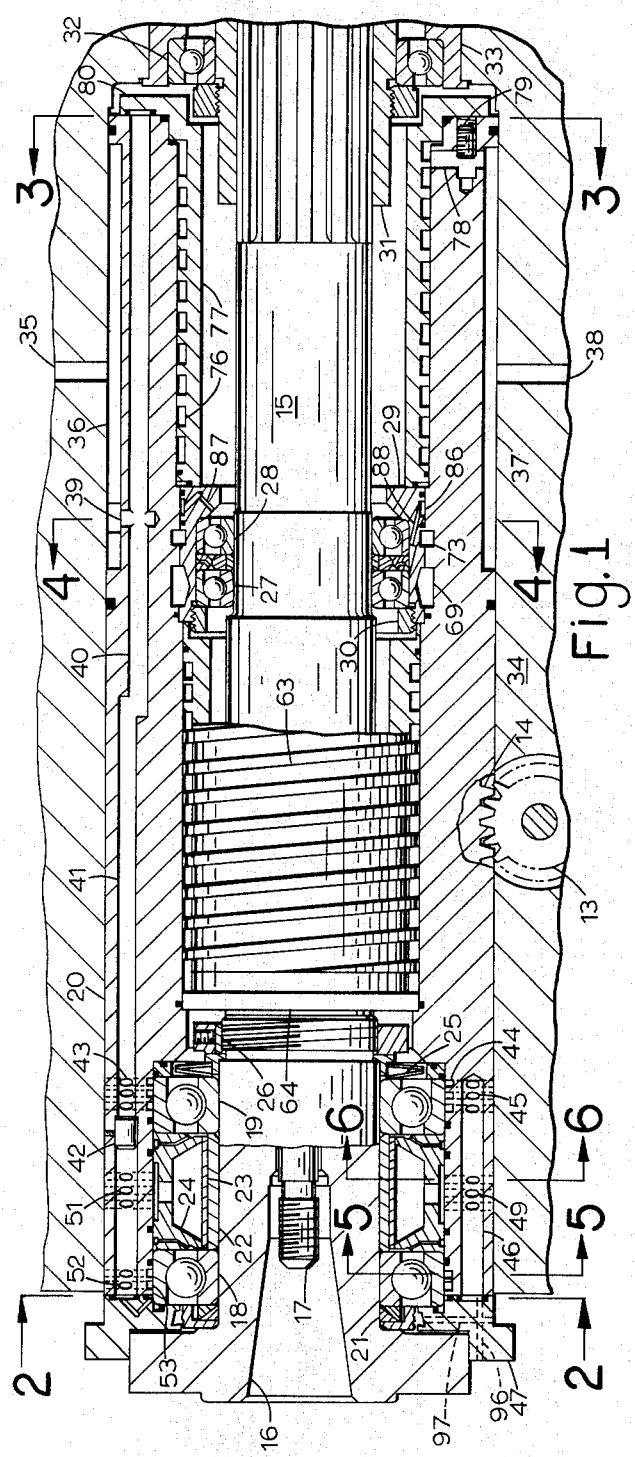
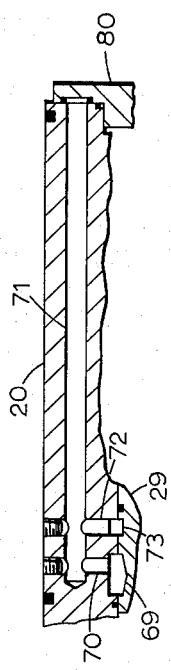
INVENTOR.
HERMAN J. BALDWIN
BY
Howard T. Keiser
& Jack J. Earl
ATTORNEYS

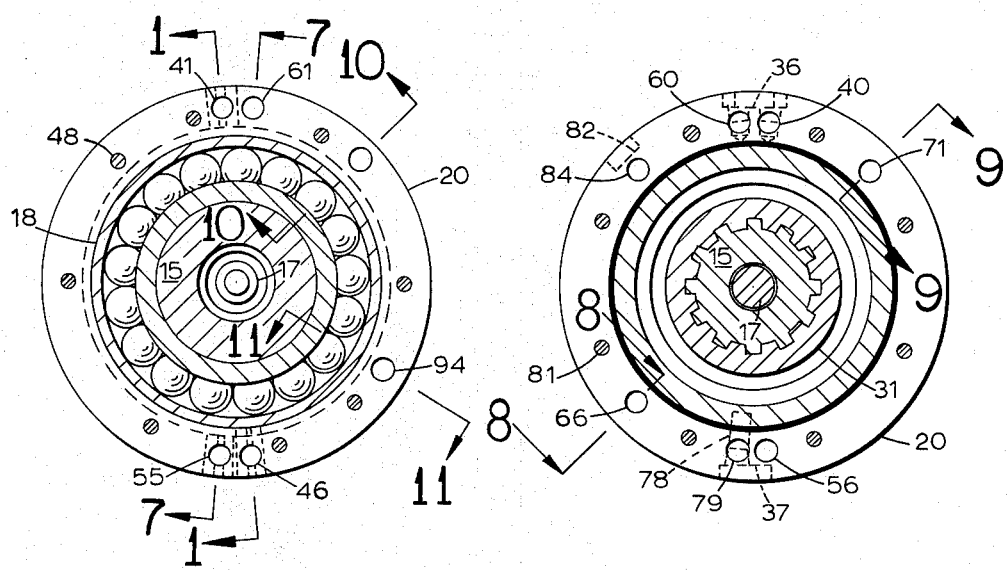
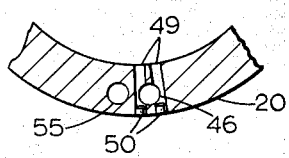
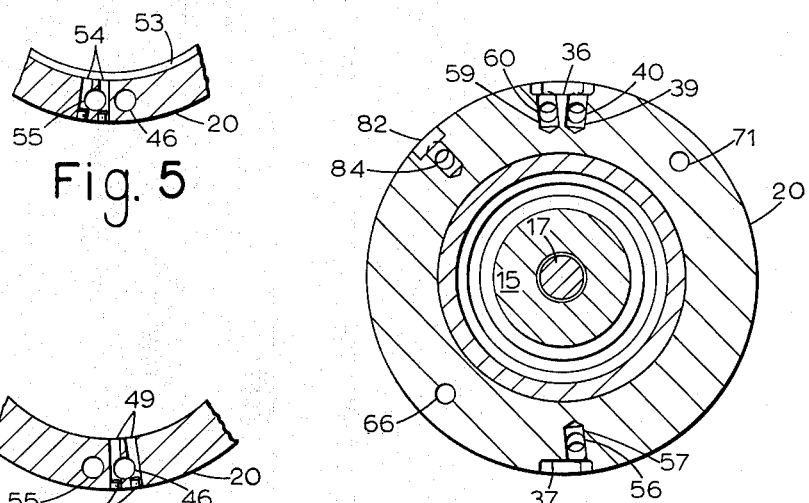

Dec. 7, 1965 H. J. BALDWIN 3,221,606
MACHINE TOOL SPINDLE COOLING SYSTEM
Filed Feb. 10, 1964 3 Sheets-Sheet 3
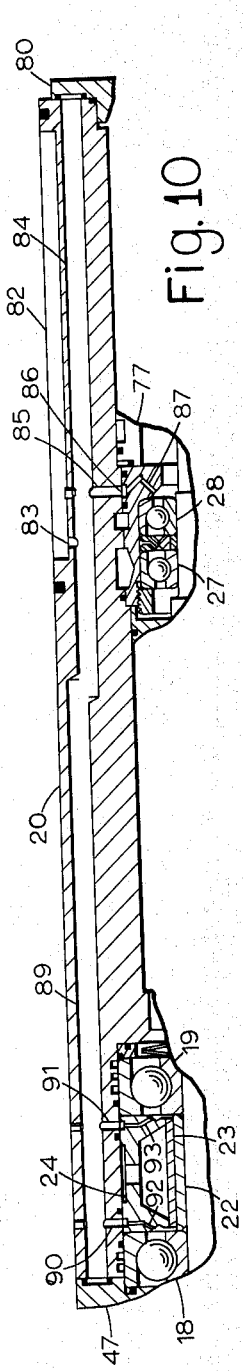
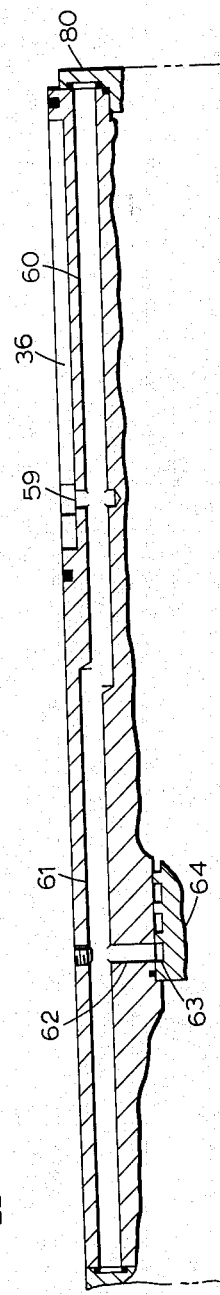
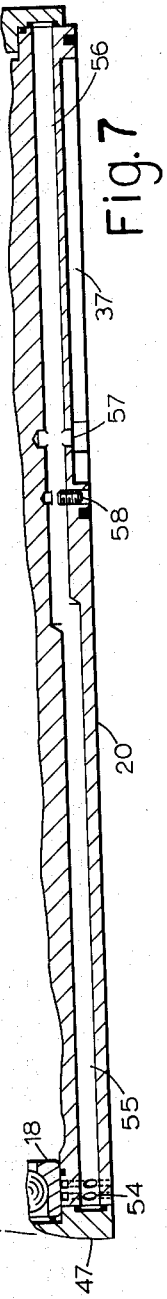
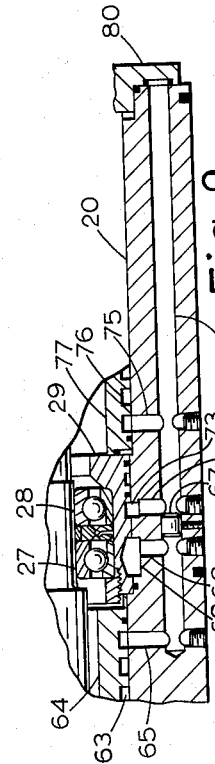
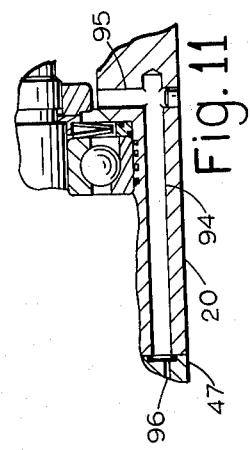

United States Patent Office 3,221,606
Patented Dec. 7, 1965

3,221,606
MACHINE TOOL SPINDLE COOLING SYSTEM
Herman J. Baldwin, Cincinnati, Ohio, assignor to The Cincinnati Milling Machine Co., Cincinnati, Ohio, a corporation of Ohio
Filed Feb. 10, 1964, Ser. No. 343,516
2 Claims. (Cl. 90—11)

The present invention relates to machine tools and more particularly to a spindle construction for milling machines to maintain spindle temperature within a desired range.

Automatically controlled milling machines operating in response to pre-recorded programs have taken control of the machine away from a machinist operator who constantly made corrections during use of the machine for variables in machine performance. A variable of this nature is spindle growth due to increase in temperature of the machine and the corrections were made by the operator over the workday as he became aware of changes in dimension of the finished workpieces, it being a practice for the machinist to periodically measure his finished work. Since temperature changes are not always the same and cannot be predicted with unfailing accuracy, they are not included in the program for automatically controlled machines and therefore it is necessary to provide a machine in which temperature changes in the spindle can be controlled or eliminated since all dimensions of a program are based on a constant spindle position in the spindle carrier.

Program controlled machines have found their greatest application thus far in the aircraft manufacture field where metals are often used having high cut-speed requirements which demand fast spindle rotation. The workpieces produced are frequently large and during machining cuts of prolonged duration are performed. Therefore a milling machine spindle is rotated at a high rate of speed for extremely long periods of time and a great amount of heat is generated at the bearings in the spindle. This is aggravated by the practice of preloading bearings to insure positional accuracy of the spindle without looseness. The heat must be removed from the spindle by some efficient means preventing both undue temperature rise and localized overheating.

It is an object of this invention to provide a machine spindle in which the temperature can be maintained at a fairly constant level.

It is also an object of this invention to provide a spindle cooling system in which a great amount of heat can be removed.

A further object of this invention is to provide a spindle cooling system in which fluid is circulated in a definite path in close proximity with the spindle mechanism throughout its length to prevent localized heating and to provide uniform temperature control throughout.

Yet another object of this invention is to provide a cooling system which is adjustable to equalize temperatures along the spindle.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In its preferred form, this invention provides a spindle with two parallel fluid circuits each of which defines a predetermined fluid path around and through the spindle mechanism in a manner such that the fluid is forced to follow the predetermined path in close contact with the structure to be cooled. One circuit is serially around the main spindle bearings where a large portion of the heat in the spindle is generated. The other fluid circuit is around and along the spindle from front to rear along a path including a bushing defining a spiral path. The fluid for the two circuits is supplied from a common input and is exhausted through a common discharge channel. Means are provided to adjust the flow of fluid through each of the circuits such that the temperature of the spindle is equalized along its length.

A clear understanding of the invention can be obtained from the following detailed description in which reference is made to the attached drawings wherein:

FIG. 1 is a longitudinal section through a milling machine spindle.
FIG. 2 is a section of the spindle of FIG. 1 on line 2—2 thereof.
FIG. 3 is a section of FIG. 1 on line 3—3 thereof.
FIG. 4 also is a section of FIG. 1 on line 4—4 thereof.
FIG. 5 is a partial section taken on line 5—5 of FIG. 1.
FIG. 6 is a partial section of FIG. 1 on line 6—6 thereof.
FIG. 7 is a section of FIG. 2 on line 7—7.
FIG. 8 is a section taken on line 8—8 of FIG. 3.
FIG. 9 is a section on line 9—9 of FIG. 3.
FIG. 10 is a section on line 10—10 of FIG. 2.
FIG. 11 is a section of FIG. 2 on line 11—11 thereof.

In FIG. 1 there is shown a spindle 15 having its forward end adapted by a tapered socket 16 to receive cutting tools (not shown) in a conventional manner. The tools are held in the socket 16 by a drawbolt 17 which extends rotatably through the spindle 15 and threadly engages a tool to draw it into the socket 16 as the drawbolt 17 is rotated. The forward end of the spindle 15 is received in main load bearings 18, 19 which are held in a quill 20 of generally cylindrical shape around the spindle 15. The forward bearing 18 is received against a bi-metal spacer 21 as shown in U.S. patent application 255,806 filed by J. V. Hemmerle, Jr., copending with the present application and assigned to the same assignee. A spacing unit, including sleeves 22, 23 and an annular channel member 24, is received between the bearings 18, 19 and around the spindle 15 within the quill 20. A set of spring washers 25 is compressed behind the rear bearing 19 by a nut 26 threaded onto the spindle 15 to provide an axial preload acting on the bearings 18, 19. The spindle 15 is rotatably supported toward its rearward end in a pair of bearings 27, 28 which are received in a bushing 29 and held therein by an externally threaded nut 30 engaged in the bushing 29. The rear of the spindle 15 is splined and a drive gear member 31 (only partly shown) is slidably received thereover to transmit rotation thereto. The gear 31 is received in a bearing 32 which is held in a bushing 33. The bushing 33 is fixed in a spindle carrier housing 34 that supports and carries the quill 20. The gear 31 and its driving mechanism are conventional and well known in the machine tool art and will not be described in further detail. The quill 20 is axially adjustable in the carrier 34 by rotation of a pinion 13 journalled in the carrier 34 and engaged with the rack teeth 14 formed along one side of the quill. This adjusts the extension of the forward end of the spindle 15 out of the carrier 34.

The quill 20 in the embodiment shown contains two fluid circuits connected between a common fluid input through a passage 35 communicating with a longitudinal slot 36 along the quill 20. Fluid under pressure is connected to the passage 35 FIGS. 1, 3, 4, at some remote location by any well known manner and preferably this fluid is oil supplied at a constant temperature from a heat exchanger unit (not shown). The common discharge from the quill circuits is through a slot 37 diametrically opposed to the slot 36 in the quill 20. The slots 36, 37 allow for the axial adjustment of the quill 20. A passage 38 connects through the carrier housing 34 to a low pressure reservoir of any conventional type.

The first of the two circuits is arranged to provide cooling for the main load bearings 18, 19 and the forward end of the spindle 15. The incoming fluid from the slot 36 is introduced through a port 39 to an axially drilled passage 40 in the quill 20. The passage 40 transmits the fluid to another axial passage 41 in which a plug 42 is inserted between its ends. A set of transverse passages 43, or ports, intersect the axial passage 41 and direct fluid inward to a set of grooves 44 which extend completely around the interior of the quill 20 and around the bearing 19. Another set of transverse passages 45 are formed in the quill diametrically across from the other passages 43 and these remove fluid from the grooves 44 and transfer it to an axial passage 46 in the forward end of the quill. Thus fluid from the passage 41 moves around the bearing 19 in two sets of semi-circular paths and is then moved axially forward through the passage 46. The forward end of the passage 46 is blocked by an annular member 47 secured to the front face of the quill 20 by machine screws 48 (FIG. 2).

A further set of transverse ports 49 intersect the axial passage 46 and direct fluid inward to the annular channel member 24 which is ported to admit the fluid to its interior where the fluid contacts the outer surface of the sleeve 23 to carry away any heat conducted thereto from the spindle 15 through the sleeve 22. As shown in FIG. 6, the transverse ports 49 chordally intersect the passage 46 on either side and are plugged at their outer ends by drive fit plugs 50 to prevent leakage around the outside of the quill 20. The ports 43 and 45 are similarly formed and plugged. The fluid is again divided to flow through semi-circular paths in the member 24 around the sleeve 23 and at the opposite side other ports 51 are drilled to intersect the passage 41 forward of the plug 42 and the fluid is then removed from the member 24 and moved axially forward in the quill 20. The fluid is then moved inward in the quill 20 through yet another set of transverse ports 52 which communicate with grooves 53 around the interior of the quill 20 at the forward bearing 18. Diametrically opposite to the ports 52 is another set of ports 54, FIG. 5, which communicate with the grooves 53 and intersect with an axial passage 55, FIG. 7. The passage 55 conducts the fluid which is passed around the bearing 18 rearwardly to an intersecting passage 56. The passage 56 is in communication with the low pressure groove 37 through a port 57 to complete the first fluid circuit. A plug 58 is threaded through the quill 20 and extends part way into the passage 56 and forms an adjustable restriction whereby the amount of flow through the circuit can be regulated by changing the impedance, or resistance to fluid flow, of the circuit.

The second cooling circuit removes heat from along the spindle 15 and quill 20 and from the rearward bearings 27, 28. Input oil is connected from the groove 36 through a port 59, FIG. 7, into an axial passage 60 parallel to the passage 40. The passage 60 is intersected by another axial passage 61. A transverse port 62 carries oil from the passage 61 inward to the center of the quill 20 where it is directed into the grooves 63 of a bushing 64, FIG. 1, which is fixed inside of the quill 20 loosely over the spindle 15. The grooves 63 extend spirally along the bushing. Fluid from the port 62 moves rearward and simultaneously circulates around the bushing to remove heat from the quill 20 and heat from the bushing 64 radiated thereto from the spindle 15. A transverse port 65, FIG. 8, intersects the grooves 63 at the rear of the bushing 64 and fluid is removed from the bushing 64 and carried to an axial passage 66. The passage 66 is blocked by a plug 67 intermediate its ends and, at the forward end of the plug 67, a port 68 directs the fluid inward to a space 69 between the quill 20 and the bushing 29 and around the first rear bearing 27. The fluid divides and follows around the bearing 27 on each side to a port 70, FIG. 9, diametrically opposite to the port 68. The port 70 intersects an axial passage 71 and a second port 72 then carries the fluid inward to a space 73 between the quill 20 and bushing 29 and around the other bearing 28. At a location diametrically opposite the port 72, the fluid is removed from the space 73 through a port 74, FIG. 8, which intersects the axial passage 66 at the rear side of the plug 67. Fluid is moved along the passage 66 to a port 75 which extends between the passage 66 and the helical grooves 76 of a second spirally grooved bushing 77, FIG. 1, in the quill 20. Fluid passes along and around the bushing 77 to a discharge port 78 at the rear of the quill which passes fluid from the spiral grooves 76 to the longitudinal low pressure groove 37 to complete the second fluid circuit. A plug 79 is positioned to extend part way into the port 78 and forms an adjustable restriction in the second circuit. The plug 79 and the plug 58 of the first circuit are relatively adjusted to provide for equalizing the temperature along the spindle 15 and quill 20 by adjusting the relative volume of flow through the two circuits described. It is also shown in FIGS. 1, 7–10 that the bushing 77 has a flange 80 which serves to close each of the axial passages in the rear portion of the quill 20, the flange 80 being secured to the quill by screws 81, FIG. 3.

The spindle mechanism shown also has provision for mist lubrication for the spindle bearings 18, 19, 27, 28. The oil and air mist is supplied to an axial groove 82, FIGS. 10, 3, 4 along the quill 20 and it passes through a port 83 into an axial passage 84. A port 85 through the quill 20 from the passage 84 admits the mist to an annular groove 86 around the bushing 29. A small drilled passage 87 allows some mist to be directed against the rear bearing 28 while another passage 88, FIG. 1, directs mist against the other bearing 27. The axial passage 84 intersects another axial passage 89 and mist is carried forward to two ports 90, 91 which direct mist through the quill 20 into small passages 92, 93 which direct mist against the main load bearings 18, 19, respectively. Mist from the rearmost bearing 28 exhausts axially rearwardly through the spindle mechanism while excess mist pressure from the other rear bearing 27 passes through the space between the bushing 64 and spindle 15. An axial passage 94, FIG. 11, in the forward end of the quill 20 communicates with a passage 95 and the passage 95 connects with that space to remove the excess mist pressure from the bearing 27 as well as from the rearward main load bearing 19. A small drilled opening 96, FIGS. 1, 11, through the member 47 exhausts from the passage 94 to the atmosphere. As shown in FIG. 1, another small radial passage 97 is formed through the member 47 intersecting the opening 96 (both shown angularly out of position in FIG. 1) and the other passage 97 relieves mist pressure from the forward main load bearing 18.

While the invention has been described in connection with one possible form or embodiment thereof, it is to be understood that the present disclosure is illustrative rather than restrictive and that changes and modifications may be made without departing from the spirit of the invention or the scope of the claims which follow.

What is claimed is:
1. In a milling machine spindle carrier having a cylindrical quill received therein, the quill having a bore therethrough, a spindle received through the quill bore, and a plurality of axially spaced antifriction bearings in the quill bore around the spindle for rotatable support thereof, a fluid cooling system comprising:
  (a) a plurality of annular grooves in the quill bore, each of the bearings having at least one of said grooves extending circumferentially therearound,
  (b) a pair of slots extending axially along the portion of the outer surface of said quill,

(c) a pair of fluid passages in the spindle carrier defining an input passage terminating at one end in one of said slots and an exhaust passage terminating at one end in the other of said slots,
(d) a bushing fixed in the quill around the spindle with the outer surface thereof contacting the surface of the quill bore,
(e) a spiral groove formed in the outside surface of said bushing and, with said quill, forming a spiral fluid channel around and along the quill bore, and
(f) means for transmitting fluid from one of said slots serially around the bearings and along the spindle to the other of said slots, said means including said spiral fluid channel and a plurality of axial passages through said quill, said axial passages having a plurality of intersecting radial ports at spaced locations along the quill, one of said ports extending between one of said axial passages and said one slot, another of said ports extending between another of said axial passages and said other slot, and other of said ports communicating between said axial passages and said annular grooves and spiral fluid channel.

2. The spindle cooling system of claim 1 wherein:
(a) said last recited means includes a plurality of fluid circuits connected in parallel between said slots,
(b) a plurality of said bushings are fixed in the quill bore around the spindle at axially spaced locations therealong the outer diameter of each of said bushings contacting said quill bore,
(c) each of said bushings has a spiral groove formed in the external surface thereof and with the quill, forms a spiral fluid channel around and along the quill bore, and
(d) one of said fluid circuits includes said spiral fluid channels connected as serial portions thereof.

References Cited by the Examiner
UNITED STATES PATENTS

| | | | |
|---|---|---|---|
| 2,448,551 | 9/1948 | Schroeder | 82—900 |
| 2,910,905 | 11/1959 | Gamet | 82—31 |
| 2,973,136 | 2/1961 | Greenwald | 308—77 |

WILLIAM W. DYER, Jr., *Primary Examiner.*